US010422285B2

(12) United States Patent
Thiriet et al.

(10) Patent No.: US 10,422,285 B2
(45) Date of Patent: Sep. 24, 2019

(54) HYDRAULIC DEVICE FOR EMERGENCY STARTING A TURBINE ENGINE, PROPULSION SYSTEM OF A MULTI-ENGINE HELICOPTER PROVIDED WITH ONE SUCH DEVICE, AND CORRESPONDING HELICOPTER

(71) Applicant: SAFRAN HELICOPTER ENGINES, Bordes (FR)

(72) Inventors: Romain Thiriet, Jurancon (FR); Bertrand Moine, Gan (FR); Camel Serghine, Boeil-Bezing (FR); François Porel, Sainte Pole (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 359 days.

(21) Appl. No.: 15/125,105

(22) PCT Filed: Mar. 20, 2015

(86) PCT No.: PCT/FR2015/050696
§ 371 (c)(1),
(2) Date: Sep. 9, 2016

(87) PCT Pub. No.: WO2015/145040
PCT Pub. Date: Oct. 1, 2015

(65) Prior Publication Data
US 2017/0016398 A1    Jan. 19, 2017

(30) Foreign Application Priority Data

Mar. 27, 2014 (FR) ...................................... 14 52643

(51) Int. Cl.
*F02C 7/275* (2006.01)
*F01D 19/00* (2006.01)
(Continued)

(52) U.S. Cl.
CPC .............. *F02C 7/275* (2013.01); *F01D 19/00* (2013.01); *F02C 6/14* (2013.01); *F02C 7/36* (2013.01);
(Continued)

(58) Field of Classification Search
CPC .. F01D 19/00; F02C 6/14; F02C 7/275; F02C 7/36; F05D 2220/329; F05D 2260/42; F05D 2260/85; F05D 2270/093; Y02T 50/672
See application file for complete search history.

(56) References Cited

U.S. PATENT DOCUMENTS 2,446,691 A    8/1948  Clyde et al.
3,998,052 A *  12/1976 Easter ..................... F01D 19/00
                                                        60/413

(Continued)

FOREIGN PATENT DOCUMENTS

DE    10 2010 041 144 A1    3/2012
GB          1032392 A         6/1966
(Continued)

OTHER PUBLICATIONS

Written Opinion of the International Searching Authority dated Jul. 10, 2015, issued in corresponding International Application No. PCT/FR2015/050696, filed Mar. 20, 2015, 9 pages.
(Continued)

*Primary Examiner* — Jesse S Bogue
(74) *Attorney, Agent, or Firm* — Christensen O'Connor Johnson Kindness PLLC

(57) ABSTRACT

Emergency start-up device for a turboshaft engine of a helicopter, comprising: a hydraulic motor which is mechanically connected to said turboshaft engine; a hydropneumatic store which is connected to said hydraulic motor by a hydraulic circuit for supplying pressurized liquid to said
(Continued)

hydraulic motor; and a hydraulic valve which has controlled quick opening, arranged on the hydraulic circuit between said store and said hydraulic motor, and is suitable for being placed on command at least in an open position in which the liquid can supply said hydraulic motor, or in a closed position in which said hydraulic motor is no longer supplied with pressurized liquid.

14 Claims, 2 Drawing Sheets

(51) Int. Cl.
*F02C 6/14* (2006.01)
*F02C 7/36* (2006.01)

(52) U.S. Cl.
CPC .... *F05D 2220/329* (2013.01); *F05D 2260/42* (2013.01); *F05D 2260/85* (2013.01); *F05D 2270/093* (2013.01); *Y02T 50/672* (2013.01)

(56) References Cited

U.S. PATENT DOCUMENTS

| | | | | |
|---|---|---|---|---|
| 4,053,746 A * | 10/1977 | Braytenbah | ............. | F01D 19/00 290/40 R |
| 4,062,185 A * | 12/1977 | Snow | ............. | F01D 19/00 60/204 |
| 5,165,232 A | 11/1992 | Amelio et al. | | |
| 5,174,109 A * | 12/1992 | Lampe | ............. | B64D 41/00 60/788 |
| 5,722,228 A * | 3/1998 | Lampe | ............. | F02C 7/26 60/778 |
| 5,735,116 A * | 4/1998 | Mouton | ............. | F02C 7/262 60/39.091 |
| 5,845,483 A * | 12/1998 | Petrowicz | ............. | F02C 7/262 60/788 |
| 8,657,566 B2 * | 2/2014 | Bedrine | ............. | F01D 15/10 415/123 |
| 9,267,438 B2 * | 2/2016 | Dooley | ............. | F02C 7/26 |
| 9,428,267 B2 * | 8/2016 | DeVita | ............. | B64C 27/12 |
| 2010/0058731 A1 * | 3/2010 | Haehner | ............. | F01D 15/08 60/39.15 |
| 2013/0213002 A1 * | 8/2013 | Asano | ............. | F02C 7/26 60/39.13 |
| 2014/0042753 A1 * | 2/2014 | Bahner | ............. | F03B 13/06 290/1 R |
| 2016/0305269 A1 * | 10/2016 | Blaney | ............. | F01D 11/22 |

FOREIGN PATENT DOCUMENTS

| | | | | |
|---|---|---|---|---|
| WO | 2008/139096 A2 | 11/2008 | | |
| WO | WO 2014203053 A1 * | 12/2014 | ............ | B64C 27/12 |

OTHER PUBLICATIONS

International Preliminary Report on Patentability dated Sep. 27, 2016, issued in corresponding International Application No. PCT/FR2015/050696, filed Mar. 20, 2015, 1 page.

International Search Report dated Oct. 7, 2015, issued in corresponding International Application No. PCT/FR2015/050696, filed Mar. 20, 2015, 2 pages.

Written Opinion of the International Searching Authority dated Oct. 7, 2015, issued in corresponding International Application No. PCT/FR2015/050696, filed Mar. 20, 2015, 7 pages.

Office Action dated Jan. 22, 2019, issued in corresponding Japanese Application No. 2016-557235, 11 pages.

* cited by examiner

HYDRAULIC DEVICE FOR EMERGENCY STARTING A TURBINE ENGINE, PROPULSION SYSTEM OF A MULTI-ENGINE HELICOPTER PROVIDED WITH ONE SUCH DEVICE, AND CORRESPONDING HELICOPTER

TECHNICAL FIELD OF THE DISCLOSURE

Embodiments of the disclosure relate to an autonomous hydraulic device for the emergency start-up of a turboshaft engine. Embodiments of the disclosure also relate to an architecture of a propulsion system of a multi-engine helicopter—in particular a twin-engine or three-engine helicopter—which is equipped with at least one such device for emergency start-up. Embodiments of the disclosure relate to a helicopter comprising a propulsion system having such an architecture.

BACKGROUND

A twin-engine or three-engine helicopter has, in a known manner, a propulsion system comprising two or three turboshaft engines, each turboshaft engine comprising a gas generator and a free turbine which is set into rotation by the gas generator and is rigidly connected to an output shaft. The output shaft of each free turbine is suitable for putting into motion a power transmission gearbox, which itself drives the rotor of the helicopter which is equipped with blades having a variable pitch.

It is known that the turboshaft engines of the helicopter operate in regimes which are dependent on the flight conditions of the helicopter. Throughout the following text, a helicopter is said to be in a cruising flight situation when it is progressing in normal conditions, during all the phases of the flight, apart from transient phases of take-off, ascent, landing or hovering flight. Throughout the following text, a helicopter is said to be in a critical flight situation when it is necessary for it to have the total installed power available, i.e. in the transient phases of take-off, ascent, landing and in a regime in which one of the turboshaft engines is malfunctioning, referred to by the abbreviation OEI (one engine inoperative).

It is known that when the helicopter is in the cruising flight situation, the turboshaft engines operate at low power levels, which are less than the maximum continuous power thereof. These low power levels lead to a specific consumption (hereafter referred to as Cs) which is defined as the ratio between the hourly consumption of fuel by the combustion chamber of the turboshaft engine and the mechanical power supplied by this turboshaft engine, which is greater than approximately 30% of the Cs of the maximum take-off power, and thus an overconsumption of fuel in cruising flight.

Furthermore, the turboshaft engines of a helicopter are designed to be oversized so that they can keep the helicopter in flight in the event of a failure of one of the engines. This flight situation corresponds to the OEI regime described above. This flight situation occurs following the loss of an engine and translates into the fact that each engine in operation supplies a power well above the rated power thereof in order to allow the helicopter to cope with a perilous situation and then be able to continue the flight.

Secondly, the turboshaft engines are also oversized in order to be able to ensure flight over the entire flight envelope specified by the aircraft manufacturer and in particular flight at high altitudes and in hot weather. These flight points, which are very contradictory, in particular when the helicopter has a mass which is close to the maximum take-off mass thereof, are only encountered in specific cases of use.

These oversized turboshaft engines are disadvantageous in terms of mass and fuel consumption. In order to reduce this consumption in cruising flight, it is envisaged to stop one of the turboshaft engines in flight and to place the engine in a regime, referred to as standby. The active engine(s) thus operates at higher power levels to supply all the necessary power, and thus at more favorable Cs levels.

In FR1151717 and FR1359766, the applicants have proposed methods of optimizing the specific consumption of the turboshaft engines of a helicopter by the possibility of placing at least one turboshaft engine in a stabilized power regime, referred to as a continuous regime, and at least one turboshaft engine in a specific standby regime, from which it can exit in an urgent or normal manner as required. An exit from the standby regime is referred to as normal when a change in flight situation necessitates the activation of the standby turboshaft engine, for example when the helicopter is going to pass from a cruising flight situation to a landing phase. A normal exit of this type from standby is carried out over a period of 10 s to 1 min. An exit from the standby regime is referred to as urgent when a failure or a deficit of power of the active engine intervenes or the flight conditions suddenly become difficult. An urgent exit of this type from standby is carried out over a period of less than 10 s.

The exit from a standby regime of a turboshaft engine and the passage from an economical flight phase to a conventional flight phase is obtained for example by a pack for the restart of the turboshaft engine which is associated with a device for storing energy such as an electrochemical store of the Li-ion battery type or an electrostatic storage of the overcapacity type, which makes it possible to supply to the turboshaft engine the energy required for restarting and quickly reaching a rated operating regime.

Such a pack for the emergency restart of the turboshaft engine in standby has the disadvantage of substantially increasing the total weight of the turboshaft engine. The benefit in terms of fuel consumption which is obtained by placing the turboshaft engine in standby is thus partly lost by the excess weight brought about by the restart device and the associated energy storage device, in particular when each turboshaft engine is equipped with an emergency restart device of this type.

Furthermore, these electrical engineering components can be dependent on the electrical architecture of the helicopter on which they are mounted.

The inventors have thus sought to reconcile problems which are incompatible a priori, namely the possibility of placing the helicopter in the economical flight phase, i.e. of placing at least one turboshaft engine in standby without generating too great an excess weight of the assembly of the propulsion system, but whilst also allowing an emergency exit from the standby regime.

In other words, the inventors have sought to propose a new device for the emergency restart of a turboshaft engine and a new architecture of the propulsion system of a twin-engine or three-engine helicopter.

The prior art also comprises the documents GB-A-1 032 392 and WO-A2-2008/139096.

SUMMARY

Embodiments of the disclosure aim to provide a device for the quick start-up of a turboshaft engine which overcomes the disadvantages of the previous solutions.

Embodiments of the disclosure also aim to provide a propulsion system of a multi-engine helicopter.

Embodiments of the disclosure also aim to provide a propulsion system of a multi-engine helicopter which allows the turboshaft engine to be placed in standby and allows the quick restart thereof.

The disclosure also aims to provide, in at least one embodiment, a propulsion system which has a mass and a volume which are not prohibitive to being carried in a helicopter.

The disclosure also aims to provide, in at least one embodiment, a propulsion system which has a lower cost than the architectures from the prior art which have the same performance.

Embodiments of the disclosure also aim to provide a method for the quick start-up of a turboshaft engine.

For this purpose or others, the disclosure relates to a device for the emergency start-up of a turboshaft engine of a helicopter, comprising:

a hydraulic motor which is mechanically connected to the turboshaft engine and is suitable for setting into rotation the engine to facilitate the start-up thereof, a hydropneumatic store which is connected to the hydraulic motor by a hydraulic circuit for supplying pressurized liquid to the hydraulic motor, a hydraulic valve which has controlled quick opening, is arranged on the hydraulic circuit between the store and the hydraulic motor, and is suitable for being placed on command at least in an open position in which the liquid can supply the hydraulic motor, thus facilitating a start-up of the turboshaft engine, or in a closed position in which the hydraulic motor is no longer supplied with pressurized liquid, a reservoir for recovering liquid which is connected to the hydraulic motor by a purge valve.

A device for the start-up of a turboshaft engine according to the disclosure thus provides a hydraulic device—which is preferably completely independent of the hydraulic network of the helicopter on which such a turboshaft engine is intended to be mounted—to ensure the start-up of the turboshaft engine.

A turboshaft engine comprises, in a known manner, a gas generator and a free turbine which is powered by the gas generator and connected to a power transmission gearbox. Preferably, a device for start-up according to the disclosure provides that the gas generator of the turboshaft engine is set into rotation by the hydraulic motor which is suitable for transforming the hydraulic power of the pressurized liquid with which the engine is supplied into mechanical power for driving the gas generator.

Liquid is supplied to the hydraulic motor by the cooperation of a hydropneumatic store and a valve which has controlled quick opening.

A start-up device of this type is thus independent of the power supply network of the helicopter and does not require bulky storage batteries. The proposed solution thus makes it possible to ensure a quick start-up of a turboshaft engine, in particular a turboshaft engine which is placed in a standby regime, without causing problems in terms of bulk, mass and cost.

Furthermore, a device according to the disclosure is simple to use and can be tested on a rig before the integration thereof in a helicopter.

The assembly formed by the recovery reservoir and the purge valve allows the liquid to be expelled from the hydraulic circuit once the pressure of the liquid in this circuit exceeds a predetermined threshold, and allows this expelled liquid to be recovered in the recovery reservoir. The purge valve defines the predetermined threshold above which the liquid is expelled from the hydraulic circuit.

Advantageously and according to the disclosure, the hydropneumatic store is selected from the group comprising a bladder-type store, a membrane-type store and a piston-type store.

Such a store comprises for example an enclosure made of metal or composite materials, a pressure sensor which makes it possible to ensure the availability of the store, a safety valve, a gas reservoir of the nitrogen, helium or argon type, and a reservoir of oil which is used as a liquid for supplying the hydraulic circuit.

Advantageously and according to the disclosure, the hydraulic motor comprises a propshaft which is mechanically connected to a shaft, referred to as a gearbox shaft, of an accessory gearbox of the turboshaft engine by meshing means comprising at least one free wheel which is supported by the propshaft.

An accessory gearbox of a turboshaft engine makes it possible to drive the auxiliary systems which are required for the operation of the gas generator of the turboshaft engine and of equipment of the helicopter, such as the air-conditioning devices. According to this variant, the hydraulic motor is directly integrated in this accessory gearbox, and this makes it possible firstly to facilitate the installation and interconnection thereof with the gas generator of the turboshaft engine, and secondly, to supply, if necessary, some of the power required to drive the auxiliary systems and/or power the equipment of the helicopter.

The presence of the free wheel makes it possible to avoid the hydraulic motor from being spontaneously driven by the accessory gearbox when the gas generator supplies mechanical power.

Advantageously and according to this variant, the meshing means further comprise:

a first meshing stage comprising the propshaft supporting a main pinion which is mounted on the free wheel and a pinion, which is referred to as a pumping pinion, a second meshing stage comprising the gearbox shaft supporting a main pinion which is meshed with the main pinion from the first meshing stage, and a pinion, which is referred to as a pumping pinion, an intermediate meshing stage comprising an intermediate shaft supporting a connection pinion, which is movable between an engaged position in which it is meshed together with the pumping pinions from the first and second meshing stages, and a disengaged position, in which it does not interfere with the pumping pinions.

A device according to this variant allows reversible operation of the device. In particular, it not only makes it possible to ensure a start-up of the turboshaft engine by the hydraulic motor, but also to reload the hydropneumatic store using the hydraulic motor as a hydraulic pump. For this purpose, an intermediate stage comprises a connection pinion which is suitable for being displaced from a position in which it is not coupled either to the propshaft or to the gearbox shaft (the hydraulic motor thus operates as a motor and supplies mechanical power to drive the shaft of the accessory gearbox) to a position in which it is coupled together with the propshaft and the gearbox shaft (the hydraulic motor thus acts as a hydraulic pump, and the shaft of the accessory gearbox sets into rotation the propshaft by means of the intermediate shaft. This intermediate shaft, which is arranged between the gearbox shaft and the propshaft, reverses the direction of rotation of the propshaft with respect to the first position, thus imparting a hydraulic pump function on the hydraulic motor).

When the hydraulic motor is used as a hydraulic pump to ensure the reloading of the hydropneumatic store, it is useful to provide a device for controlling the purge valve to prevent the non-return operation thereof.

The disclosure also relates to a propulsion system of a multi-engine helicopter comprising turboshaft engines which are connected to a power transmission gearbox, comprising:

at least one turboshaft engine among the turboshaft engines, referred to as a hybrid turboshaft engine, which is configured to operate in at least one standby regime during a stabilized flight of the helicopter, the other turboshaft engines operating only during this stabilized flight, at least one device for the emergency restart of a hybrid turboshaft engine according to the disclosure which is suitable for being able to take this hybrid turboshaft engine out of the standby regime and reach a regime, referred to as the rated regime, in which it supplies mechanical power to the power transmission gearbox.

A device for the start-up of a turboshaft engine according to the disclosure is intended in particular to be integrated in a propulsion system of a multi-engine helicopter comprising at least one turboshaft engine which is configured to be placed in standby. The hydraulic start-up device makes it possible to ensure the emergency restart of the turboshaft engine in standby when required.

A hybrid turboshaft engine is a turboshaft engine which is designed to be able to be placed, on command and voluntarily, in at least one predetermined standby regime, which it can exit in a normal or quick manner (also referred to as an urgent manner). A turboshaft engine can only be in standby during a stabilized flight of the helicopter, i.e. when there is no failure of a turboshaft engine of the helicopter, during a cruising flight situation, when the helicopter is progressing in normal conditions. The exit from the standby regime consists in passing the turboshaft engine into the acceleration mode of the gas generator by a drive which is compatible with the exit mode imposed by the conditions (normal exit from standby or quick exit from standby (also referred to as emergency exit).

Advantageously, a propulsion system according to a variant of the disclosure comprises two hybrid turboshaft engines and two emergency restart devices according to the disclosure, each hybrid turboshaft engine being associated with a restart device.

According to this variant, the system has a separate hydraulic supply for each hydraulic motor for restarting each hybrid turboshaft engine.

Advantageously, a system according to another variant of the disclosure comprises two hybrid turboshaft engines and a single restart device according to the disclosure which comprises two hydraulic motors which are connected to each hybrid turboshaft engine, respectively, the hydraulic valve being a latching valve which is controlled to orient the fluid towards the hydraulic motor of the hybrid turboshaft engine to be restarted.

According to this variant, the latching valve is controlled to orient the liquid of the hydraulic circuit towards the hybrid turboshaft engine which has to be restarted.

Embodiments of the disclosure also relate to a helicopter comprising a propulsion system.

An embodiment of the disclosure also relates to a method for the emergency start-up of a turboshaft engine of a helicopter, comprising:

a step of controlling the opening of a hydraulic valve which is arranged on a hydraulic circuit between a hydropneumatic store and a hydraulic motor which is mechanically connected to the turboshaft engine, a step of guiding the liquid which is taken off towards the hydraulic motor, a step of transforming, by the hydraulic motor, the hydraulic power of the pressurized liquid into mechanical power to bring about the start-up of the turboshaft engine.

The disclosure also relates to a device for the start-up of a turboshaft engine, a propulsion system of a multi-engine helicopter, a helicopter which is equipped with a propulsion system, and a method for the start-up of a turboshaft engine, characterized in combination by all or some of the features mentioned above or below.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
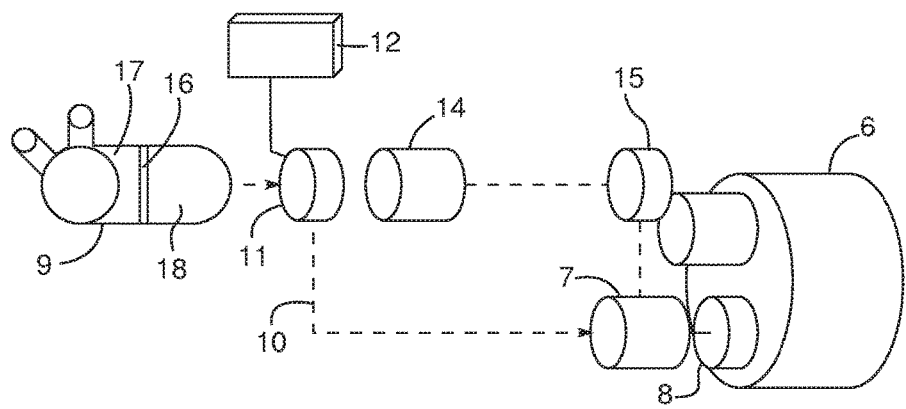
FIG. 1 is a schematic view of a device for the start-up of a turboshaft engine according to one embodiment of the disclosure.

FIG. 1 is a schematic view of a device for the start-up of a turboshaft engine 6 according to one embodiment of the disclosure.

Such a device comprises a hydraulic motor 7 which is mechanically connected to the turboshaft engine 6 by means of a free wheel 8. This hydraulic motor 7 can be a motor having axial or radial pistons. The function thereof is to transform the hydraulic power that it receives into mechanical power, thus making it possible to bring about the start-up of the turboshaft engine.

This hydraulic motor 7 is preferably mounted on the turboshaft engine 6 by an accessory gearbox, which is not shown in FIG. 1.

The device further comprises a hydropneumatic store 9 which is connected to the hydraulic motor 7 by a hydraulic circuit 10 for supplying pressurized liquid to this hydraulic motor 7. This hydropneumatic store 9 is, according to the embodiment in FIG. 1, a monobloc piston-type store 16. The piston 16 defines a compartment 17 for gas having a variable volume and a compartment 18 for oil having a variable volume. The gas compartment 17 is for example filled with nitrogen, helium or argon. This gas from the gas compartment 17 exerts a pressure on the piston 16 which can be moved towards an increase in the volume of the gas compartment 17 and a reduction in the volume of the oil compartment 18. The oil is thus pushed towards the hydraulic circuit 10.

The supply of the hydraulic motor 7 is dependent on a hydraulic valve 11 which has controlled quick opening and is arranged on the hydraulic circuit 10 between the store 9 and the hydraulic motor 7.

This hydraulic valve 11 is controlled by a control device 12, which is preferably the control computer of the turboshaft engine 6, which further makes it possible to define the operating regime of the turboshaft engine.

When the valve 11 is controlled in opening, the oil from the oil compartment 18 of the store 9 is ejected towards the hydraulic motor 7 so that the motor transforms the hydraulic power of the oil which is received into mechanical power at the output.

The start-up device also comprises a reservoir 14 for recovering liquid which is connected to the hydraulic motor 7 by a purge valve 15. This valve is set in such a way that the oil is ejected from the circuit 10 once the pressure exceeds a predetermined threshold.

Figure 2:
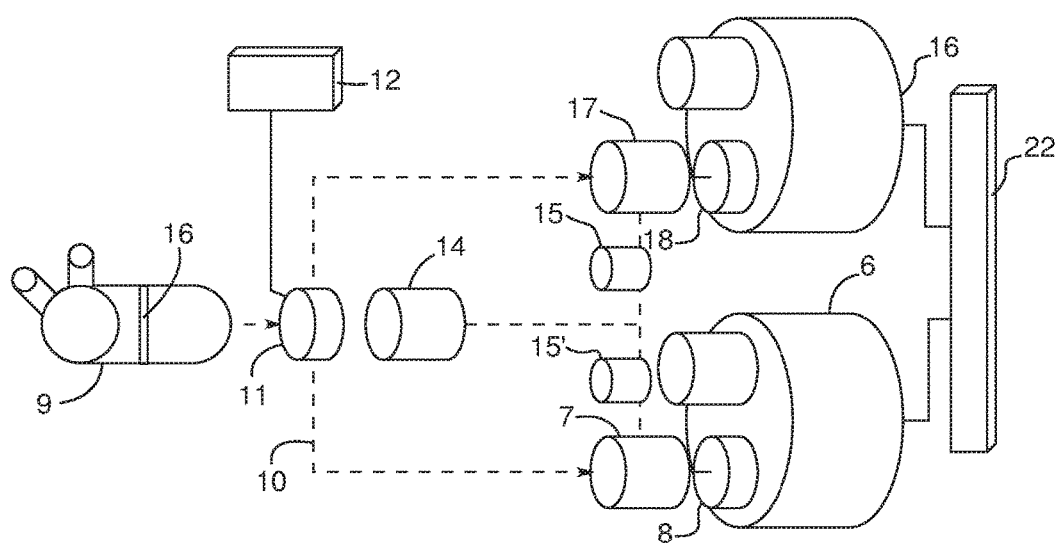
FIG. 2 is a schematic view of an architecture of a propulsion system of a helicopter according to one embodiment of the disclosure.

The start-up device from FIG. 1 is advantageously provided in an architecture of a propulsion system of a twin-engine helicopter as shown in FIG. 2.

According to the embodiment in FIG. 2, the propulsion system comprises two turboshaft engines 6, 16 which are connected to a power transmission gearbox 22, which in turn drives a rotor of the helicopter (not shown in the drawings). Each turboshaft engine is a hybrid turboshaft engine, which can be placed in at least one standby regime during a stabilized flight of the helicopter, from which it can exit again in an emergency by a start-up device according to the disclosure. A turboshaft engine comprises, in a known manner, a gas generator, a combustion chamber and a free turbine.

The standby regime is for example one of the following operating regimes:

a standby regime, referred to as a conventional idling regime, in which the combustion chamber is ignited, and the shaft of the gas generator rotates at a speed of between 60 and 80% of the rated speed, a standby regime, referred to as a conventional super idling regime, in which the combustion chamber is ignited, and the shaft of the gas generator rotates at a speed of between 20 and 60% of the rated speed, a standby regime, referred to as an assisted super idling regime, in which the combustion chamber is ignited, and the shaft of the gas generator rotates, with mechanical assistance, at a speed of between 20 and 60% of the rated speed, a standby regime, referred to as a banking regime, in which the combustion chamber is extinguished, and the shaft of the gas generator rotates, with mechanical assistance, at a speed of between 5 and 20% of the rated speed, a standby regime, referred to as a shutdown regime, in which the combustion chamber is extinguished, and the shaft of the gas generator is at a complete stop.

The start-up device comprises, in addition to the elements described in connection with FIG. 1, a hydraulic motor 17 which is connected to the turboshaft engine 16 by a free wheel 18. Furthermore, the hydraulic circuit 10 extends from the hydropneumatic store 9 as far as the hydraulic motor 17 and the hydraulic motor 7.

The controlled valve 11 is, according to this embodiment, a three-way valve which is suitable for allowing, on command, either the supply of the hydraulic motor 17 which is connected to the turboshaft engine 16, or the supply of the hydraulic motor 7 of the turboshaft engine 6. The command is dependent on the turboshaft engine in standby which has to exit the standby regime thereof in an emergency.

The operating principle of the start-up device of this architecture is, for each turboshaft engine 6, 16, identical to that described in connection with FIG. 1.

Figure 3:
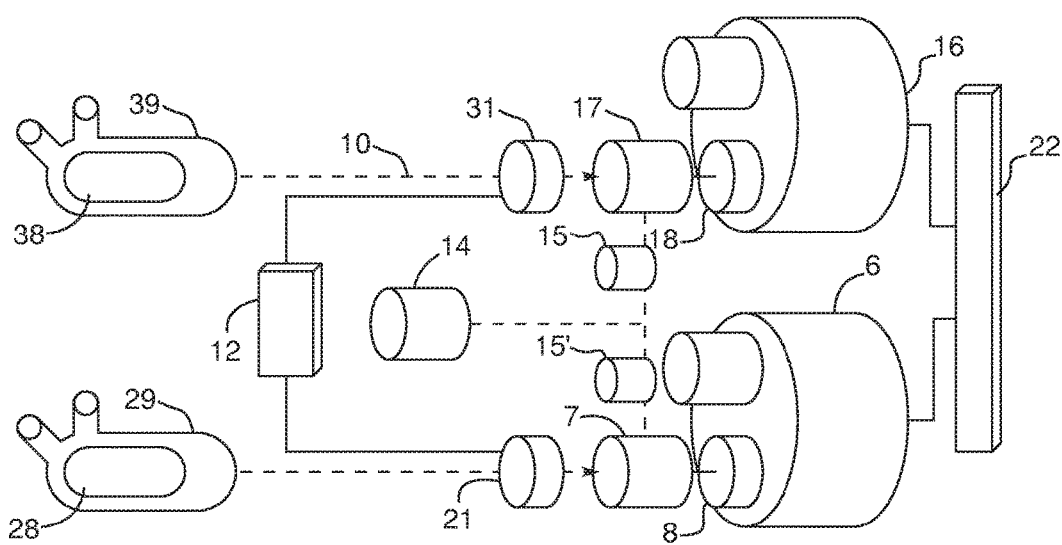
FIG. 3 is a schematic view of an architecture of a propulsion system of a helicopter according to another embodiment of the disclosure.

FIG. 3 is a propulsion system according to another embodiment of the disclosure. According to this embodiment, a separate start-up device is provided for each turboshaft engine. In other words, a hydropneumatic store 29, 39 is associated with each hydraulic motor 7, 17, and a valve 21, 31 is associated with each store 29, 39 to ensure the supply of the motors and the restart of the corresponding turboshaft engine. The valves 21, 31 are controlled by the control unit 12. Only the reservoir 14 for recovering oil is common to the two start-up devices. According to another variant which is not shown in the drawings, all the elements are separate, including the recovery reservoir 14.

The propulsion system further comprises, for each engine 6, 16, a separate purge valve 15, 15' which is associated with this engine. Each purge valve 15, 15' has a dual function.

Firstly, when the associated engine is inactive, it makes it possible to keep the oil inside the engine. The purge valve thus makes it possible to avoid the engine starting empty.

Secondly, when one of the two engines starts, the oil from the return line of the engine in operation must be prevented from supplying the other engine (which would otherwise also start rotating). The purge valve thus makes it possible in this situation to act as a non-return device for isolating the other engine.

Furthermore, according to the embodiment from FIG. 3, the hydropneumatic stores 29, 39 are bladder-type stores. Each store 29, 39 comprises a bladder 28, 38 containing a gas, of the nitrogen, argon or helium type, which is arranged within the enclosure of the store which is filled with oil. Such a bladder plays the role of the gas compartment 17 of the store 9 from FIG. 1. In another embodiment, the hydropneumatic stores are membrane-type or piston-type stores.

Figure 4:
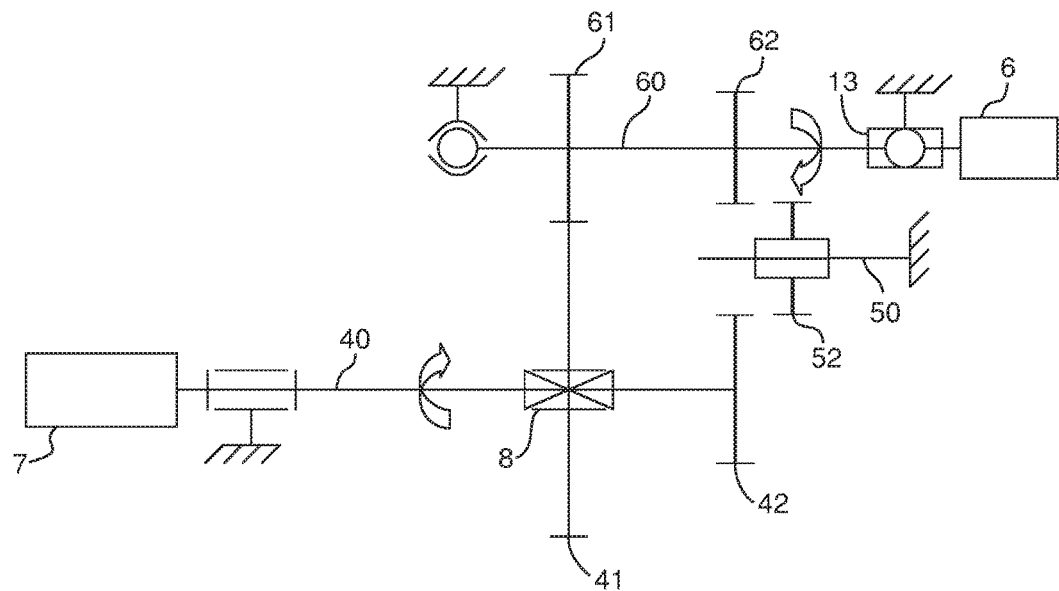
FIG. 4 is a schematic view of meshing means of a start-up device according to one embodiment of the disclosure in a position in which the device operates in the motor mode.
Figure 5:
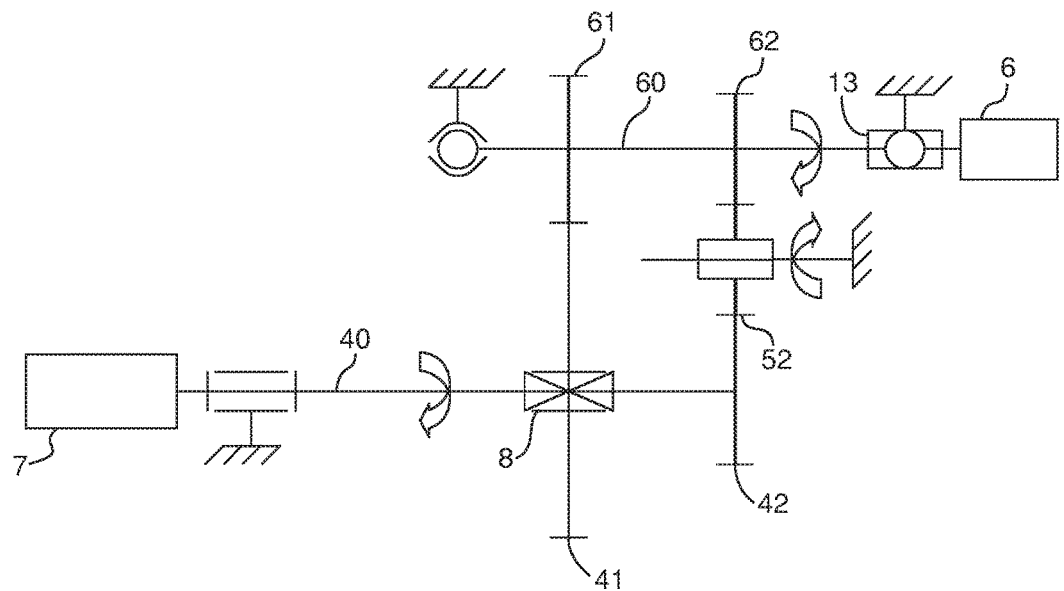
FIG. 5 is a schematic view of meshing means of a start-up device according to one embodiment of the disclosure in a position in which the device operates in the pump mode.

FIGS. 4 and 5 are schematic views of one embodiment of the mechanical connection between the hydraulic motor 7 and an accessory gearbox 13 of the turboshaft engine 6.

This mechanical connection is formed by meshing means which comprise a first meshing stage formed by a propshaft 40, which is the output shaft of the hydraulic motor 7, a main pinion 41 which is supported by the propshaft 40 and mounted on the free wheel 8, and a pumping pinion 42.

The meshing means further comprise a second meshing stage formed by a gearbox shaft 60, a main pinion 61 which is supported by the gearbox shaft 60 and meshed with the main pinion 41 from the first meshing stage, and a pumping pinion 62 which is supported by the gearbox shaft 60.

The meshing means lastly comprise an intermediate meshing stage which is formed by an intermediate shaft 50 supporting a connection pinion 52.

The connection pinion 52 is configured to have two positions, an engaged position which is shown by FIG. 5, and a disengaged position which is shown by FIG. 4.

In the engaged position in FIG. 5, the pinion is set into rotation by the pumping pinion 62 which is supported by the shaft 60 of the accessory gearbox 13, and the pinion sets into rotation the pumping pinion 42 which is supported by the propshaft 40. Thus, in this position, the shaft 40 is set into rotation by the shaft 60 of the accessory gearbox. The hydraulic motor 7 thus operates in the hydraulic pump mode, and this makes it possible to re-inject the oil towards the hydropneumatic store. The free wheel 8 permits the free rotation of the pinion 41.

In the disengaged position in FIG. 4, the pinion 52 is not mechanically connected to the pumping pinions 42, 62. Also, in this position, the main pinion 41 which is supported by the propshaft 40 drives the pinion 61 which is supported by the shaft 60 of the accessory gearbox. This position is the position which allows the quick start-up of the turboshaft engine.

The displacement of the pinion 52 from the disengaged position into the engaged position can be ensured by a hydraulic, pneumatic or electric actuator, or by any equivalent means.

The principle of using a device for the start-up of a turboshaft engine within a twin-engine architecture as shown in FIG. 2 is as follows:

when the flight conditions are favorable, an order is emitted to place a turboshaft engine in standby to save fuel (standby regime selected from the standby regimes mentioned above).

the computers of the turboshaft engines then determine which turboshaft engine can be placed in standby and order the placement in standby thereof (in the following, the turboshaft engine 6 is considered to be placed in standby, and only the turboshaft engine 16 supplies power to the power transmission gearbox 22), the turboshaft engine 6 is in the standby regime (this standby regime can be one of the above-mentioned standby regimes, with an ignited or extinguished chamber, with or without mechanical assistance), during the flight, the turboshaft engine 16 suddenly fails, or the pilot decides to carry out an emergency restart of the turboshaft engine 6 for a specific emergency maneuver, the combustion chamber of the turboshaft engine 6 is then quickly reignited (in the case of a standby regime with an extinguished chamber), after a predetermined period of time, the control unit 12 orders the opening of the latching valve 11 towards the turboshaft engine 6, the hydraulic motor 7 then passes quickly (in a period of time of less than a second) from 0 rpm to the docking speed of the gas generator initially in the standby regime whilst transforming the hydraulic power into mechanical power, making it possible to drive the gas generator of the turboshaft engine 6 by the free wheel 8, the hydraulic motor 7 follows the drive of the turboshaft engine 6 for a short period of time, for example of less than 10 seconds, during which time the turboshaft engine has reached the emergency regime thereof, the emergency start-up of the turboshaft engine 6 is thus obtained.

The docking speed corresponds to the standby speed of the gas generator divided by the ratio of reduction in speeds between the shaft of the gas generator and the input of the accessory gearbox of the turboshaft engine on which the hydraulic starter is mounted.

A device according to the disclosure thus makes it possible to quickly restart a turboshaft engine in standby which has recourse only to members which are inexpensive, are simple to use and install, can be tested on rigs and make it possible to reload the hydropneumatic store.

The disclosure is not limited to only the described embodiments. In particular, the propulsion system can comprise three turboshaft engines for equipping a three-engine helicopter, and a person skilled in the art can easily determine, based on the teachings of the present text, how to adapt the described embodiments to a multi-engine, in particular three-engine, propulsion system.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An emergency start-up device for a turboshaft engine of a helicopter, comprising:
   a hydraulic motor configured to be mechanically connected to said turboshaft engine and is configured to set into rotation said engine to facilitate the start-up thereof;
   a hydropneumatic store connected to said hydraulic motor by a hydraulic circuit, the hydropneumatic store configured to supply pressurized liquid to said hydraulic motor;
   a hydraulic valve being connected between said hydropneumatic store and said hydraulic motor, wherein the hydraulic valve is controllable between at least an open position in which the liquid can supply said hydraulic motor for facilitating a start-up of said turboshaft engine when the device is used with said turboshaft engine and a closed position in which said hydraulic motor is no longer supplied with pressurized liquid; and
   a reservoir configured for recovering liquid, the reservoir being connected to said hydraulic motor by a purge valve;
   wherein said hydraulic motor comprises a propshaft configured to be mechanically connected to a gearbox shaft of an accessory gearbox of said turboshaft engine by meshing means comprising at least one free wheel supported by said propshaft, wherein said meshing means further comprise:
      a first meshing stage comprising said propshaft supporting a main pinion mounted on said free wheel and a first pumping pinion;
      a second meshing stage comprising said gearbox shaft supporting a main pinion meshed with said main pinion from said first meshing stage, and a second pumping pinion; and
      an intermediate meshing stage comprising an intermediate shaft supporting a connection pinion movable between an engaged position in which the connection pinion is engaged together with said first and second pumping pinions from the first and second stages, and a disengaged position in which the connection pinion does not interfere with said pumping pinions from the first and second stages.

2. A propulsion system for a multi-engine helicopter comprising turboshaft engines which are suitable for being connected to a power transmission gearbox, comprising:

at least one hybrid turboshaft engine among said turboshaft engines, said at least one hybrid turboshaft engine being capable of operating in at least one standby regime during a stabilized flight of the helicopter, the other turboshaft engines operating only during this stabilized flight; and at least one emergency start-up device for the emergency start-up of the at least one hybrid turboshaft engine, said at least one device configured to transfer said at least one hybrid turboshaft engine out of said standby regime and reach a rated regime in which it supplies mechanical power to said power transmission gearbox, said emergency start-up device comprising:

a hydraulic motor configured to be mechanically connected to said hybrid turboshaft engine and configured to set into rotation said hybrid turboshaft engine to facilitate the start-up thereof;

a hydropneumatic store connected to said hydraulic motor by a hydraulic circuit, the hydropneumatic store configured to supply pressurized liquid to said hydraulic motor;

a hydraulic valve being connected between said hydropneumatic store and said hydraulic motor, wherein the hydraulic valve is controllable between at least an open position in which the liquid can supply said hydraulic motor for facilitating a start-up of said hybrid turboshaft engine when the device is used with said hybrid turboshaft engine and a closed position in which said hydraulic motor is no longer supplied with pressurized liquid; and a reservoir configured for recovering liquid, the reservoir being connected to said hydraulic motor by a purge valve.

3. The system according to claim 2, wherein said at least one hybrid turboshaft engine includes two turboshaft engines and wherein two emergency start-up devices are provided, each turboshaft engine of said two hybrid turboshaft engines being associated with an emergency start-up device.

4. The system according to claim 2, wherein said at least one hybrid turboshaft engine includes two turboshaft engines and wherein a single emergency start-up device including two hydraulic motors is provided, each hydraulic motor connected to one of the hybrid turboshaft engines of said two hybrid turboshaft engines, respectively, said hydraulic valve being a three-way valve controlled to orient the fluid towards said hydraulic motor of the hybrid turboshaft engine to be restarted.

5. The system according to claim 2, wherein said hydropneumatic store includes a bladder.

6. The system according to claim 2, wherein said hydropneumatic store includes a membrane.

7. The system according to claim 2, wherein said hydropneumatic store includes a piston.

8. The system according to claim 2, wherein the hydropneumatic store includes a first compartment of variable volume having a gas stored therein and a second compartment of variable volume having a hydraulic liquid stored therein.

9. The system according to claim 2, wherein the gas is selected from a group selected from nitrogen, helium, and argon.

10. The system according to claim 2, wherein said hydropneumatic store is selected from the group consisting of a bladder-type store, a membrane-type store and a piston-type store.

11. The system according to claim 2, wherein said hydraulic motor comprises a propshaft configured to be mechanically connected to a gearbox shaft of an accessory gearbox of said hybrid turboshaft engine by meshing means comprising at least one free wheel supported by said propshaft.

12. The system according to claim 11, wherein said meshing means further comprise:

a first meshing stage comprising said propshaft supporting a main pinion mounted on said free wheel and a pumping pinion;

a second meshing stage comprising said gearbox shaft supporting a main pinion meshed with said main pinion from said first meshing stage, and a pumping pinion; and an intermediate meshing stage comprising an intermediate shaft supporting a connection pinion movable between an engaged position in which it is engaged together with said pumping pinions from the first and second stages, and a disengaged position in which it does not interfere with said pumping pinions from the first and second stages.

13. The system according to claim 2, wherein said hydraulic motor comprises a propshaft configured to be mechanically connected to a gearbox shaft of an accessory gearbox of said hybrid turboshaft engine by a transmission comprising at least one free wheel supported by said propshaft.

14. A helicopter comprising the propulsion system according to claim 2.

* * * * *